US009436431B2

(12) United States Patent
Jacobs et al.

(10) Patent No.: US 9,436,431 B2
(45) Date of Patent: Sep. 6, 2016

(54) ANONYMOUSLY TAILORING ENVIRONMENTS TO THE PREFERENCES OF PHYSICALLY PROXIMATE USERS

(71) Applicants: Kevin Jacobs, Hillsboro, OR (US); David Schaefer, Beaverton, OR (US); Charles Baron, Chandler, AZ (US)

(72) Inventors: Kevin Jacobs, Hillsboro, OR (US); David Schaefer, Beaverton, OR (US); Charles Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 14/368,446

(22) PCT Filed: Dec. 24, 2013

(86) PCT No.: PCT/US2013/077637
§ 371 (c)(1),
(2) Date: Jun. 24, 2014

(87) PCT Pub. No.: WO2015/099694
PCT Pub. Date: Jul. 2, 2015

(65) Prior Publication Data
US 2015/0178042 A1    Jun. 25, 2015

(51) Int. Cl.
*G06F 17/00* (2006.01)
*G06F 3/16* (2006.01)
*H04W 4/02* (2009.01)
*H04L 29/08* (2006.01)
*H04W 4/04* (2009.01)

(52) U.S. Cl.
CPC .............. *G06F 3/165* (2013.01); *H04W 4/021* (2013.01); *H04L 67/306* (2013.01); *H04W 4/043* (2013.01)

(58) Field of Classification Search
CPC .. H04W 4/021; H04W 4/043; H04L 67/306; G06F 3/165; G06F 17/30017; G06F 17/30029; G06F 17/30035; G06F 17/30053; G06F 17/30699; G06F 17/3074; G06F 17/30761; G06F 17/30766; G11B 27/102; G11B 27/105
USPC .......................................................... 700/94
See application file for complete search history.

(56) References Cited

U.S. PATENT DOCUMENTS

| 6,498,955 | B1 | 12/2002 | McCarthy et al. | |
|---|---|---|---|---|
| 8,612,860 | B2 * | 12/2013 | Singer .................... | G06Q 30/02 715/730 |
| 8,841,986 | B2 * | 9/2014 | Holman ................. | G08C 17/00 340/4.42 |

(Continued)

FOREIGN PATENT DOCUMENTS

| KR | 10-0590697 B1 | 6/2006 |
|---|---|---|
| KR | 10-1144333 B1 | 5/2012 |
| KR | 10-2013-0129761 A | 11/2013 |

OTHER PUBLICATIONS

International Search Report and Written Opinion received for PCT Patent Application No. PCT/US2013/077637, mailed on Sep. 11, 2014, 11 pages.

*Primary Examiner* — Hemant Patel
(74) *Attorney, Agent, or Firm* — Jordan IP Law, LLC

(57) ABSTRACT

Systems and methods may detect a proximity of one or more client devices to a venue that provides ambient music and generate an anonymous playlist based on preference data associated with the one or more client devices. Additionally, the anonymous playlist may be sent to the venue. In one example, one or more additional venue suggestions are sent to at least one of the one or more client devices based on the preference data and one or more playlists associated with the one or more additional venues.

25 Claims, 5 Drawing Sheets

(56) References Cited

U.S. PATENT DOCUMENTS

| | | | |
|---|---|---|---|
| 9,066,404 B2* | 6/2015 | Paolini | G06Q 30/0641 |
| 2006/0046743 A1 | 3/2006 | Mirho | |
| 2007/0266065 A1* | 11/2007 | Rosenberg | G06F 17/30053 |
| 2008/0091717 A1* | 4/2008 | Garbow | G06F 17/30749 |
| 2009/0222392 A1* | 9/2009 | Martin | G11B 27/105 706/46 |
| 2014/0140590 A1* | 5/2014 | Wilson | G06K 9/00362 382/128 |
| 2015/0205573 A1* | 7/2015 | Kaplan | G06Q 30/00 700/94 |

* cited by examiner

ANONYMOUSLY TAILORING ENVIRONMENTS TO THE PREFERENCES OF PHYSICALLY PROXIMATE USERS

TECHNICAL FIELD

Embodiments generally relate to venues that provide ambient music. More particularly, embodiments may relate to anonymously tailoring ambient music environments to the preferences of physically proximate users.

BACKGROUND

Many "brick and mortar" establishments such as coffee shops, bars or stores may play ambient music for the purpose of entertaining customers and increasing a positive perception of the establishment. While recent developments may have been made to enable an establishment to interrogate the devices of visitors for playlist information, there remains considerable room for concern. For example, some customers may not be comfortable with providing an establishment direct access to their devices. Moreover, some customers may want to hear particular music while visiting the establishment but may not want the request for that music to be attributed to them.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
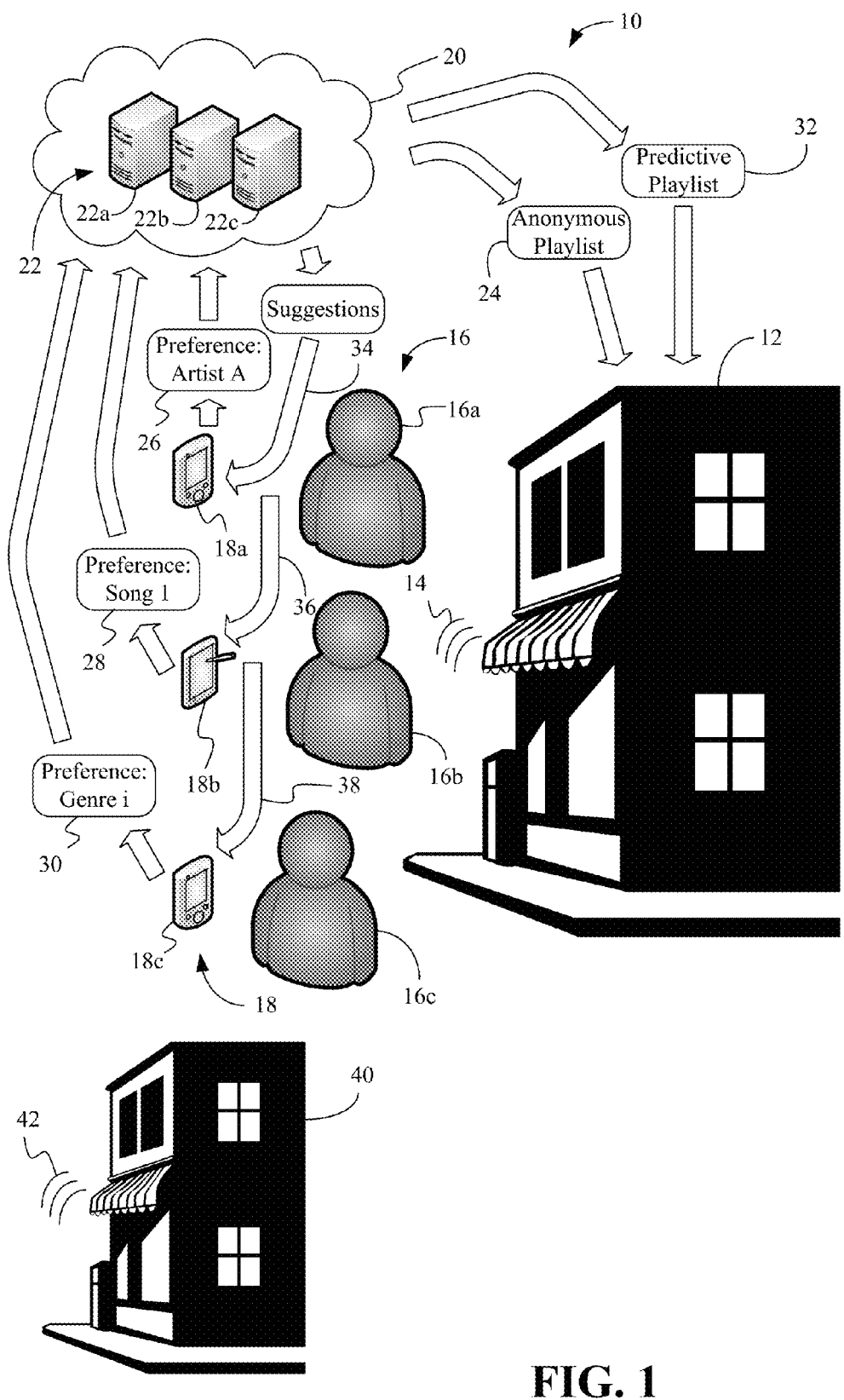
FIG. 1 is an illustration of an example of a networking architecture in which a cloud-based playlist server tailors an environment to the preferences of physically proximate users according to an embodiment.

Turning now to FIG. 1, a networking architecture 10 is shown in which a venue 12 such as, for example, a coffee shop, bar, store, restaurant, etc., provides ambient music 14 to individuals/users 16 (16a-16c) within physical proximity of the venue 12. The music 14 may generally be designed and/or selected to entertain the users 16 and/or increase a positive perception of the venue 12 on the part of the users 16. For example, the venue 12 might be a clothing store within a shopping center, wherein the users 16 may walk by, enter and/or otherwise be within audible range of the music 14 played by the venue 12.

In the illustrated example, the users 16 carry and/or operate client devices 18 (18a-18c) that contain preference data such as, for example, music playlists, lighting preferences, temperature preferences, and so forth. A cloud-based service 20 (20a-20c) including one or more playlist servers 22 (22a-22c) may obtain the preference data from the client devices 18 via interactions that are transparent to the users 16, generate an anonymous playlist 24 based on the preference data, and send the anonymous playlist 24 to the venue 12. The venue 12 may subscribe to, register with and/or otherwise obtain permission to receive the anonymous playlist 24 from the cloud-based service 20. Accordingly, the cloud-based service 20 may function as a "playlist broker" between the venue 12 and the users 16.

For example, a first user 16a of a first client device 18a may also subscribe to, register with and/or otherwise agree (e.g., in a previous offline process) to share preference data with the cloud-based service 20. The subscription/registration process may not involve, however, divulging the identity or personal details of the first user 16a to the owner and/or operator of the venue 12. In one example, the first client device 18a contains a number of songs by "Artist A", wherein the name of Artist A may be included in a first set of preference data 26 sent from the first client device 18a to the cloud-based service 20. The first set of preference data 26 may also include lighting preferences, temperature preferences, and so forth. For example, if the first user 16a has previously indicated a preference for relatively bright environmental lighting, then that preference may also included in the first set of preference data 26.

Location data indicating the geographic position of the first client device 18a may also be transmitted with the first set of preference data 26 to the cloud-based service 20. In this regard, the geographic position of the first client device 18a might be determined based on global positioning system (GPS) coordinates, wireless access point connectivity, etc., or any combination thereof. Moreover, the transmission of the location data and/or the first set of preference data 26 may be transparent to the first user 16a. For example, the first client device 18a may periodically report its location to the cloud-based service 20, without involving the first user 16a in the reporting. Other techniques, such as background queries may also be used to transparently transfer information between the first client device 18a and the cloud-based service 20.

In addition, the first client device 18a may filter the first set of preference data 26 based on the location data, calendar data associated with the first user 16a, message data associated with the first user 16a, and so forth. Such an approach may be particularly useful for users that like many different types of music. For example, if the first client device 18a also contains music from Artist X, the first client device 18a might filter the music from Artist X out of the first set of preference data 26 if the location data indicates that Artist X's music would be inappropriate for that particular location, the calendar of the first user 16a indicates that the first user 16a is scheduled to be in a location for which Artist X's music would be inappropriate, one or more emails, instant messages, social networking posts and/or text messages on the first client device 18a indicate that Artist X's music is currently inappropriate, and so forth.

Similarly, a second client device 18b carried by a second user 16b may contain "Song 1", by Artist B, wherein Song 1 might be included in a second set of preference data 28 sent from the second client device 18b to the cloud-based service 20, if the second user 16b has subscribed to such a service. The second set of preference data 28 may also include lighting preferences, temperature preferences (e.g., relatively cold environmental temperatures), and so forth. Additionally, location data indicating the geographic position of the second client device 18b (e.g., GPS coordinates, wireless access point connectivity) may be transmitted with the second set of preference data 28 to the cloud-based service 20, wherein the transmission of the location data and/or the second set of preference data 28 may be transparent to the second user 16b (e.g., periodically, in response to a background query, etc.).

As already noted with respect to the first client device 18a, the second client device 18b may filter the second set of preference data 28 based on the location data, calendar data associated with the second user 16b, message data associated with the second user 16b, and so forth. For example, if the second client device 18b also contains Song 2 by Artist B, the second client device 18b might filter Song 2 out of the second set of preference data 28 if the location data indicates that Song 2 would be inappropriate for that particular location, the calendar of the second user 16b indicates that the second user 16b is scheduled to be in a location for which Song 2 would be inappropriate, one or more emails, instant messages, social networking posts and/or text messages on the second client device 18b indicate that Song 2 is currently inappropriate, and so forth.

Additionally, a third user 16c of a third client device 18c may subscribe to the cloud-based service 20. In such a case, the third client device 18c may contain a number of songs from "Genre I", wherein Genre i may be included in a third set of preference data 30 sent from the third client device 18c to the cloud-based service 20. The third set of preference data 30 may also include lighting preferences (e.g., relatively dim environmental lighting), temperature preferences (e.g., relatively warm environmental temperatures), and so forth. Additionally, location data indicating the geographic position of the third client device 18c (e.g., GPS coordinates, wireless access point connectivity) may be transmitted with the third set of preference data 30 to the cloud-based service 20, wherein the transmission of the location data and/or the third set of preference data 30 may be transparent to the third user 16c (e.g., periodically, in response to a background query, etc.).

As already noted with respect to the first and second client devices 18a, 18b, the third client device 18c may filter the third set of preference data 30 based on the location data, calendar data associated with the third user 16c, message data associated with the third user 16c, and so forth. For example, if the third client device 18c also contains music from Genre j, the third client device 18c may filter Genre j out of the third set of preference data 30 if the location data indicates that Genre j would be inappropriate for that particular location, the calendar of the third user 16c indicates that the third user 16c is scheduled to be in a location for which Genre j would be inappropriate, one or more emails, instant messages, social networking posts and/or text messages on the third client device 18c indicate that Genre j is currently inappropriate, and so forth.

The illustrated cloud-based service 20 generates the anonymous playlist 24 based on the first, second, and third sets of preference data 26, 28, 30, respectively, and sends the anonymous playlist 24 to the venue 12. The venue 12 may to use the anonymous playlist 24 to structure the music 14 so that it is likely to entertain the users 16 and/or increase a positive perception of the venue 12 on the part of the users 16. The illustrated venue 12 does not, however, have access to the identities of the users 16 or access to the client devices 18 carried by the users 16.

The cloud-based service 20 may also determine a future audience of the venue 12 and generate a predictive playlist 32 based on preference data associated with the future audience. For example, the cloud-based service 20 might determine from historical location data that certain users tend to be in the vicinity of the venue at certain times (e.g., seniors in the morning) and other users tend to be in the vicinity of the venue 12 at other times (e.g., youth in the afternoon). To the extent that those users have subscribed to the cloud-based service 20, the cloud-based service 20 may obtain preference data and location data from the client devices carried by those users and use the preference data to generate the predictive playlist 32.

Thus, the predictive playlist 32 might include, for example, a morning component that has the music, lighting and temperature preferences of seniors expected to be near the venue 12 in the mornings, an afternoon component that has the music, lighting and temperature preferences of youth expected to be near the venue 12 in the afternoons, and so forth. In this regard, the venue 12 may use the predictive playlist 32 to attract certain types of customers during targeted time periods. Alternatively, the venue 12 may use the predictive playlist 32 to discourage the presence of (e.g., "drive away") particular types of customers during targeted time periods (e.g., play music to keep teenagers away while moms are shopping).

The illustrated cloud-based service 20 also sends additional venue suggestions 34, 36, 38 to the client devices 18 based on the ambient music of one or more additional venues such as, for example, the ambient music 42 of an additional venue 40. For example, the cloud-based service 20 might determine that the additional venue 40 plays music by Artist A. In such a case, the additional venue suggestion 34 may indicate the venue 40 as another option for the first user 16a, particularly if the venue 40 is nearby and/or the venue 12 does not typically play music by Artist A at the relevant time in question. Upon receiving the additional venue suggestion 34, the first client device 18a may present the additional venue suggestion 34 to the first user 16a (e.g., "The Playlist Server recommends shopping at . . . "). Similarly, the cloud-based service 20 may also determine that the additional venue 40 (or another nearby venue) plays Song 1, by Artist B and therefore incorporate venue 40 into the additional venue suggestion 36 for the second user 16b. Additionally, the cloud-based service 20 may determine that the additional venue 40 (or another nearby venue) plays music from Genre i and therefore incorporate venue 40 into the additional venue suggestion 38 for the third user 16c.

Figure 2:
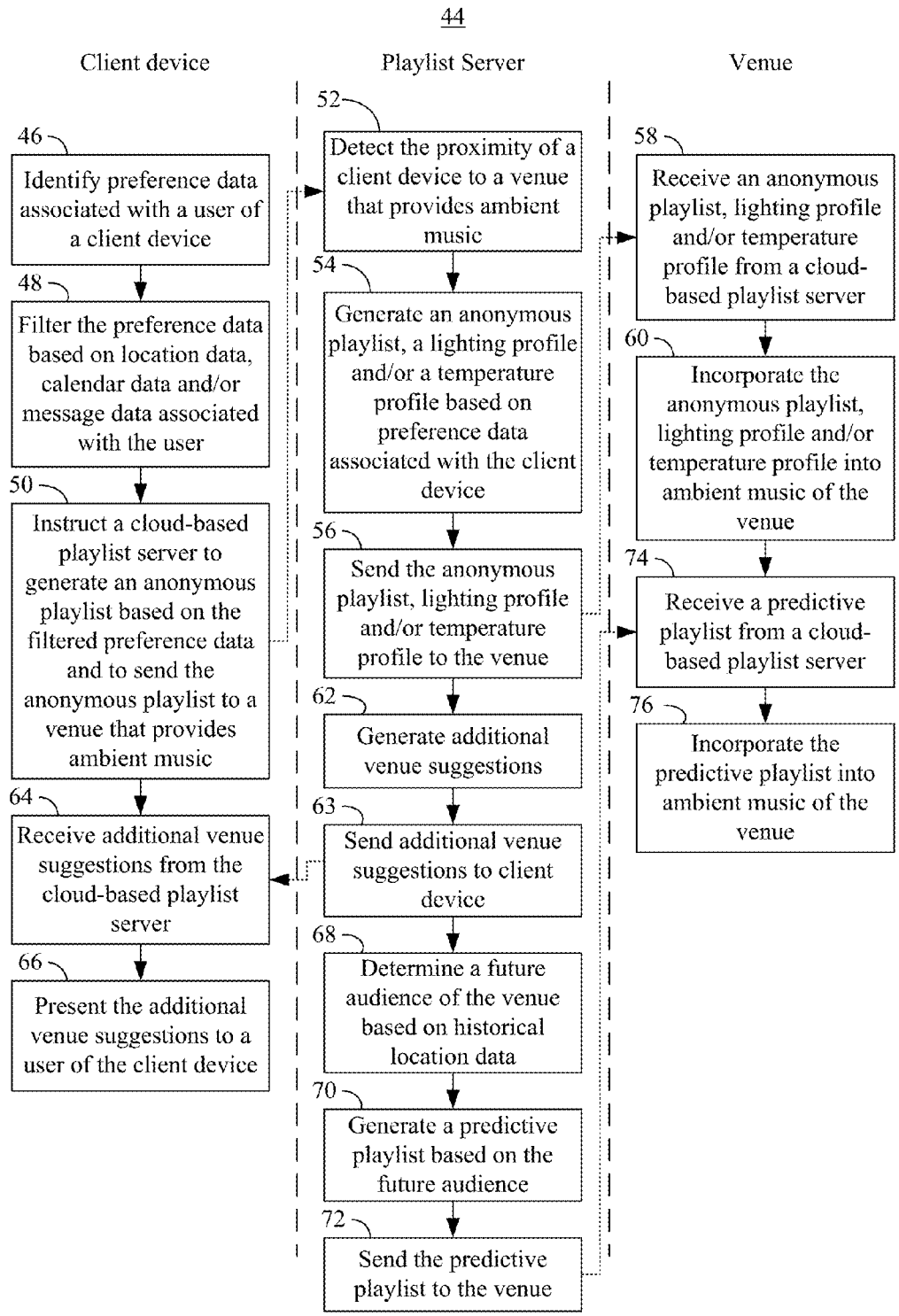
FIG. 2 is a flowchart of an example of a method of anonymously tailoring environments to the preferences of physically proximate users according to an embodiment.

Turning now to FIG. 2, a method 44 of anonymously tailoring environments is shown. The method 44 may be implemented as a set of logic instructions stored in a machine- or computer-readable storage medium such as random access memory (RAM), read only memory (ROM), programmable ROM (PROM), firmware, flash memory, disk, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 44 may be written in any combination of one or more programming languages, including an object oriented programming language such as Java, Smalltalk, C++ or the like and conventional procedural programming languages, such as the "C" programming language or similar programming languages.

Illustrated client processing block 46 provides for identifying preference data associated with a user of a client device. The preference data may include, for example, a music playlist, a lighting preference, a temperature preference, etc., or any combination thereof. The preference data may be filtered at client block 48 based on location data associated with the user, calendar data associated with the user, message data associated with the user, etc., or any combination thereof. Illustrated client block 50 instructs a cloud-based playlist server such as, for example, one or more of the servers 22 (FIG. 1), to generate an anonymous playlist based on the filtered preference data and send the anonymous playlist data to a venue that provides ambient music. The transmission of the preference data and/or location data may constitute the instruction, which may therefore be either explicit or implicit, wherein the transmission may be transparent to the user of the client device. Moreover, the instruction need not positively identify a particular venue.

Server processing block 52 may detect the proximity of the client device to a venue that provides ambient music. The proximity may be detected based on location data (e.g., GPS coordinates, wireless access point connectivity) from the client device. Additionally, illustrated server block 54 generates an anonymous playlist, a lighting profile and/or a temperature profile based on the preference data associated with the client device. As already noted, the anonymous playlist might include artists, songs, genres, etc., that are preferred by the user of the client device, or by users of other client devices near the venue in question. The lighting profile may also take into consideration the lighting preferences received from the client device and/or other client devices near the venue in question. In one example, the playlist server averages individual lighting preferences to obtain a setting for the lighting profile. Similarly, the temperature profile may take into consideration the temperature preferences received from the client device and/or other client devices near the venue in question, wherein individual lighting preferences may be averaged to obtain a setting for the temperature profile. Other preferences and/or settings may also be incorporated into the anonymous playlist.

Illustrated server block 56 sends the anonymous playlist, lighting profile and/or temperature profile to the venue, wherein venue processing block 58 receives the anonymous playlist, lighting profile and/or temperature profile from the playlist server. The venue may incorporate the anonymous playlist, lighting profile and/or temperature profile into the ambient music and/or environmental conditions of the venue at venue block 60.

Moreover, one or more additional venue suggestions may be generated at server block 62 based on the preference data of the client device and one or more playlists associated with the additional venues, wherein server block 63 may send the additional venue suggestions to the client device. Illustrated client block 64 receives the additional venue suggestions from the playlist server, and client block 66 may present the additional venue suggestions to the user of the client device.

In addition, server block 68 may determine a future audience of the venue based on historical location data received from a plurality of devices, wherein a predictive playlist may be generated at server block 70 based on preference data associated with the future audience. Illustrated server block 72 sends the predictive playlist to the venue. The predictive playlist may be received at venue block 74, wherein venue block 76 incorporates the predictive playlist into the ambient music of the venue.

Figure 3A:
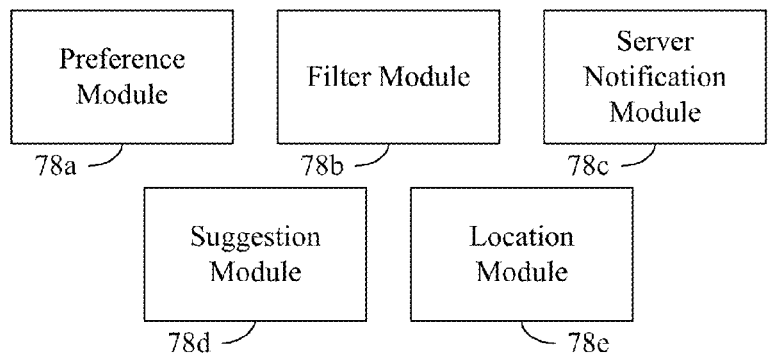
FIGS. 3A-3C are block diagrams of examples of logic architectures according to embodiments.

Turning now to FIG. 3A, a client logic architecture 78 (78a-78e) is shown, wherein the client logic architecture 78 may implement one or more of the client processing blocks of the method 44 (FIG. 2) in one or more client devices such as, for example, the client devices 18 (FIG. 1), already discussed. The illustrated architecture 78 includes a preference module 78a to identify preference data associated with a user of a client device, wherein the preference data includes one or more of a music playlist, a lighting preference or a temperature preference. A filter module 78b may filter the preference data based on one or more of location data associated with the user, calendar data associated with the user or message data associated with the user. The illustrated architecture 78 also includes a server notification module 78c to instruct a cloud-based playlist server to generate an anonymous playlist based on the filtered preference data and send the anonymous playlist to a venue that provides ambient music.

The illustrated architecture 78 also includes a suggestion module 78d to receive one or more additional venue suggestions from the cloud-based playlist server and present the one or more additional venue suggestions to the user. In one example, a location module 78e sends the location data to the cloud-based playlist server via an interaction that is transparent to the user. Moreover, the cloud-based playlist server may be instructed to generate the anonymous playlist via an interaction that is transparent to the user.

Figure 3B:
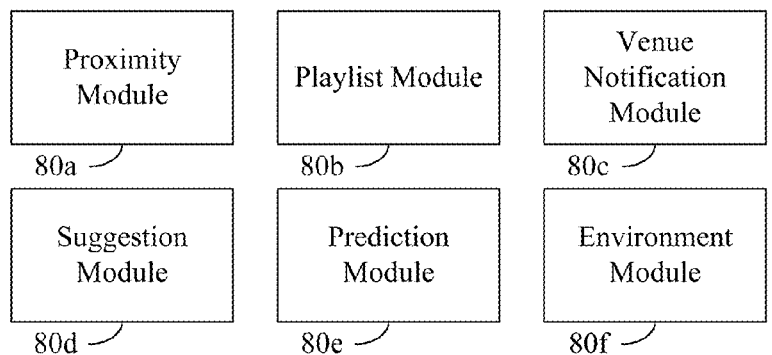

FIG. 3B shows a server logic architecture 80 (80a-80f), wherein the server logic architecture 80 may implement one or more of the server processing blocks of the method 44 (FIG. 2) in one or more cloud-based playlist servers such as, for example, the servers 22 (FIG. 1), already discussed. The illustrated architecture 80 includes a proximity module 80a to detect a proximity of one or more client devices to a venue that provides ambient music. A playlist module 80b may generate an anonymous playlist based on preference data associated with the one or more client devices, wherein the anonymous playlist may be sent to the venue by a venue notification module 80c.

The illustrated architecture 80 also includes a suggestion module 80d to suggest one or more additional venues to users of the one or more client devices based on the preference data and one or more playlists associated with the one or more additional venues. Moreover, a prediction module 80e may determine a future audience of the venue and generate a predictive playlist based on preference data associated with the future audience, wherein the venue notification module 80c may send the predictive playlist to the venue. In one example, the future audience is determined based on historical location data received from a plurality of client devices. In addition, an environmental module 80f may generate one or more of a lighting profile or a temperature profile based on the preference data, wherein the venue notification module 80c may send one or more of the lighting profile or the temperature profile to the venue.

In one example, the proximity module 80a receives location data from the one or more client devices in interactions that are transparent to users of the one or more client devices, wherein the proximity of the one or more client devices to the venue is detected based on the location data. Moreover, the playlist module 80b may receive one or more playlists from the one or more client devices in interactions that are transparent to users of the one or more client devices, wherein the preference data includes the one or more user playlists.

Figure 3C:
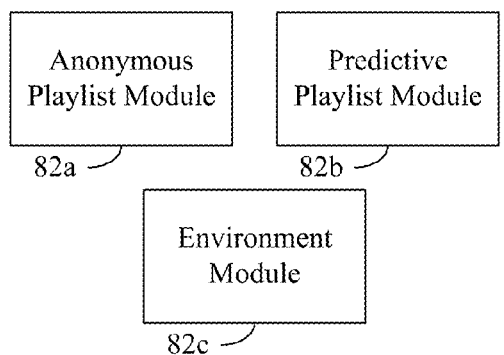

Turning now to FIG. 3C, a venue logic architecture 82 (82a-82c) is shown, wherein the venue logic architecture 82 may implement one or more of the venue processing blocks of the method 44 (FIG. 2) in one or more venues such as, for example, the venues 12, 40 (FIG. 1), already discussed. The illustrated architecture 82 includes an anonymous playlist module 82a to receive an anonymous playlist from a cloud-based playlist server and incorporate the anonymous playlist into ambient music provided by the venue. Additionally, a predictive playlist module 82b may receive a predictive playlist from a cloud-based playlist server and incorporate the predictive playlist into ambient music provided by the venue. The illustrated architecture 82 also includes an environment module 82c that receives a lighting and/or temperature profile from a cloud-based playlist server and incorporates the lighting and/or temperature profile into one or more environmental settings of the venue.

Figure 4:
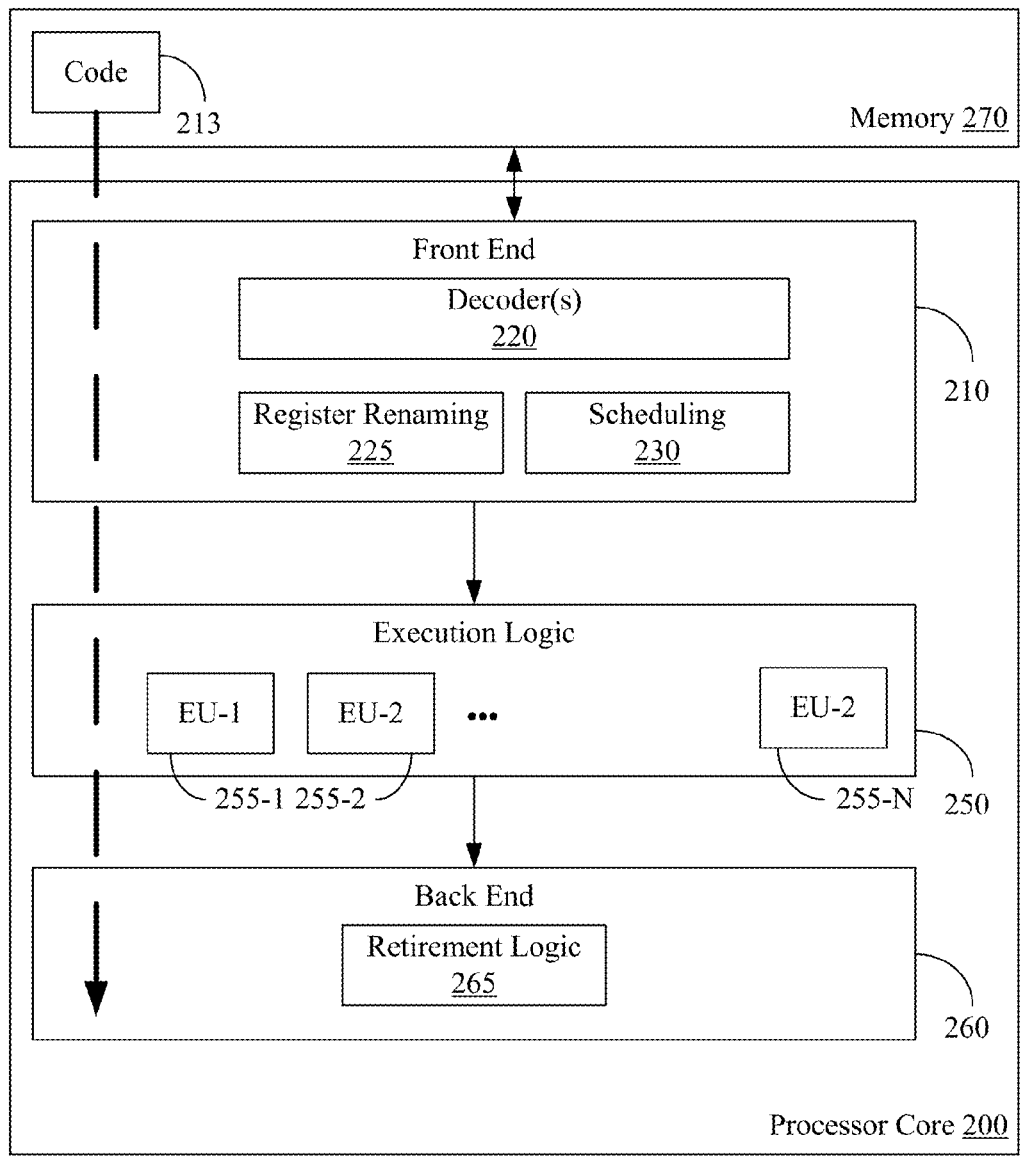
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement one or more aspects of the method 44 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
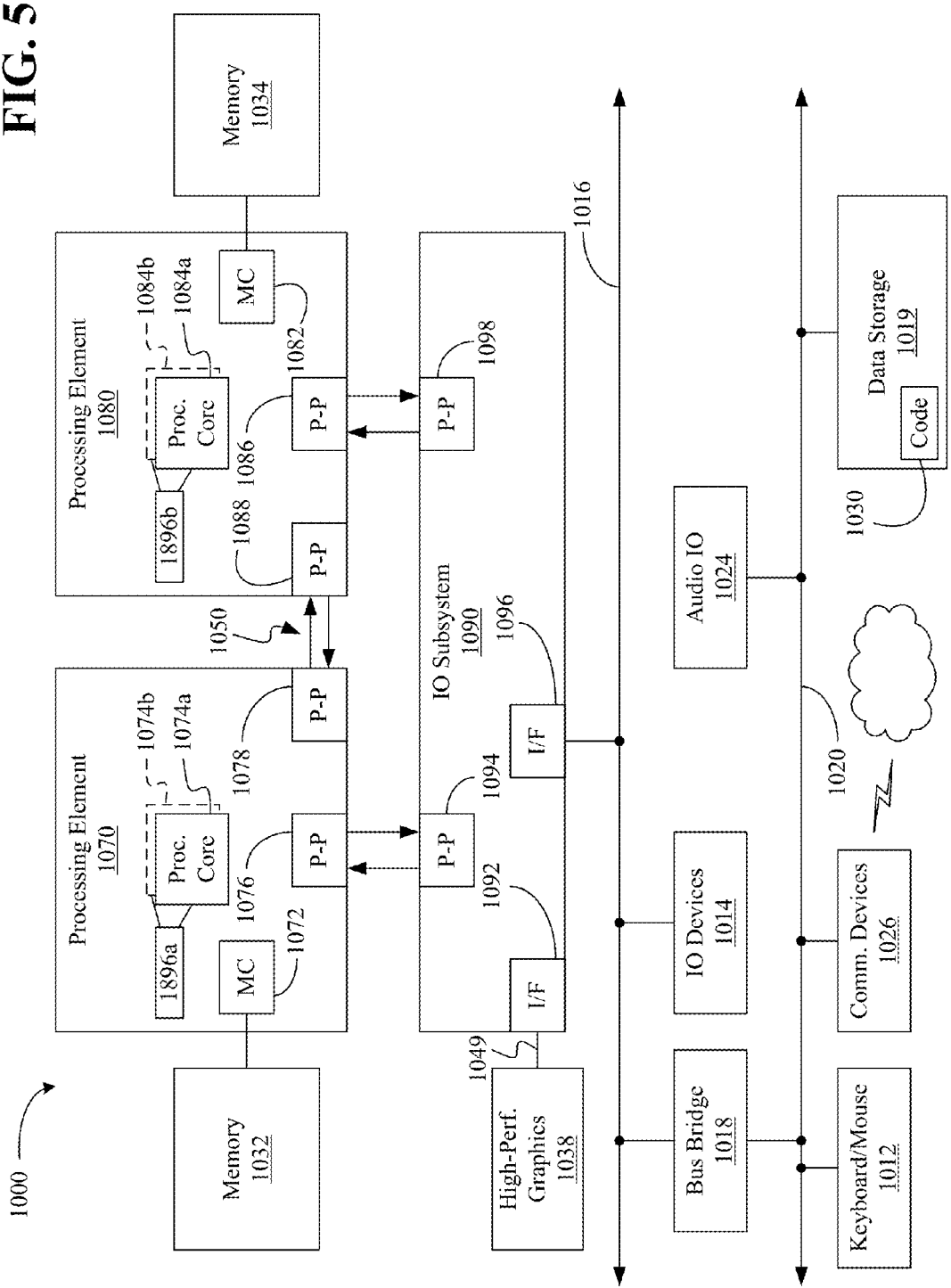
FIG. 5 is a block diagram of an example of a system according to an embodiment.

Referring now to FIG. 5, shown is a block diagram of a system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 4.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 44 (FIG. 2), already discussed, and may be similar to the code 213 (FIG. 4), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes and Examples

Example 1 may include an apparatus to serve playlists, comprising a proximity module to detect a proximity of one or more client devices to a venue that provides ambient music, a playlist module to generate an anonymous playlist based on preference data associated with one or more client devices, and a venue notification module to send the anonymous playlist to the venue.

Example 2 may include the apparatus of Example 1, further including a suggestion module to suggest one or more additional venues to users of the one or more client devices based on the preference data and one or more playlists associated with the one or more additional venues.

Example 3 may include the apparatus of Example 1, further including a prediction module to determine a future audience of the venue and generate a predictive playlist based on preference data associated with the future audience, wherein the venue notification module is to send the predictive playlist to the venue.

Example 4 may include the apparatus of Example 3, wherein the future audience is to be determined based on historical location data received from a plurality of client devices.

Example 5 may include the apparatus of Example 1, wherein the proximity module is to receive location data from the one or more client devices in interactions that are transparent to users of the one or more client devices, and wherein the proximity of the one or more client devices to the venue is to be detected based on the location data.

Example 6 may include the apparatus of Example 1, wherein the playlist module is to receive one or more user playlists from the one or more client devices in interactions that are transparent to users of the one or more client devices, and wherein the preference data is to include the one or more user playlists.

Example 7 may include the apparatus of any one of Examples 1 to 6, further including an environment module to generate one or more of a lighting profile or a temperature profile based on the preference data, wherein the venue notification module is to send one or more of the lighting profile or the temperature profile to the venue.

Example 8 may include a method of operating a cloud-based playlist server, comprising detecting a proximity of one or more client devices to a venue that provides ambient music, generating an anonymous playlist based on preference data associated with the one or more client devices, and sending the anonymous playlist to the venue.

Example 9 may include the method of Example 8, further including sending one or more additional venue suggestions to at least one of the one or more client devices based on the preference data and one or more playlists associated with the one or more additional venues.

Example 10 may include the method of Example 8, further including determining a future audience of the venue, generating a predictive playlist based on preference data associated with the future audience, and sending the predictive playlist to the venue.

Example 11 may include the method of Example 10, wherein the future audience is determined based on historical location data received from a plurality of client devices.

Example 12 may include the method of Example 8, further including receiving location data from the one or more client devices in interactions that are transparent to users of the one or more client devices, wherein the proximity of the one or more client devices to the venue is detected based on the location data.

Example 13 may include the method of Example 8, further including receiving one or more user playlists from the one or more client devices in interactions that are transparent to users of the one or more client devices, wherein the preference data includes the one or more user playlists.

Example 14 may include the method of any one of Examples 8 to 13, further including generating one or more of a lighting profile or a temperature profile based on the preference data, and sending one or more of the lighting profile or the temperature profile to the venue.

Example 15 may include at least one computer readable storage medium comprising a set of instructions which, if executed, cause a cloud-based playlist server to detect a proximity of one or more client devices to a venue that provides ambient music, generate an anonymous playlist based on preference data associated with the one or more client devices, and send the anonymous playlist to the venue.

Example 16 may include the computer readable storage medium of Example 15, wherein the instructions, if executed, cause a computer to suggest one or more additional venues to users of the one or more client devices based on the preference data and one or more playlists associated with the one or more additional venues.

Example 17 may include the computer readable storage medium of Example 15, wherein the instructions, if executed, cause a computer to determine a future audience of the venue, generate a predictive playlist based on preference data associated with the future audience, and send the predictive playlist to the venue.

Example 18 may include the computer readable storage medium of Example 17, wherein the future audience is to be determined based on historical location data received from a plurality of client devices.

Example 19 may include the computer readable storage medium of Example 15, wherein the instructions, if executed, cause a cloud-based playlist server to receive location data from the one or more client devices in interactions that are transparent to users of the one or more client devices, wherein the proximity of the one or more client devices to the venue is to be detected based on the location data.

Example 20 may include the computer readable storage medium of Example 15, wherein the instructions, if executed, cause a cloud-based playlist server to receive one or more user playlists from the one or more client devices in interactions that are transparent to users of the one or more client devices, wherein the preference data is to include the one or more user playlists.

Example 21 may include the computer readable storage medium of any one of Examples 15 to 20, wherein the instructions, if executed, cause a cloud-based playlist server to generate one or more of a lighting profile or a temperature profile based on the preference data, and send one or more of the lighting profile or the temperature profile to the venue.

Example 22 may include a client device comprising a preference module to identify preference data associated with a user of the client device, wherein the preference data includes one or more of a music playlist, a lighting preference or a temperature preference, a filter module to filter the preference data based on one or more of location data associated with the user, calendar data associated with the user or message data associated with the user, and a server notification module to instruct a cloud-based playlist server to generate an anonymous playlist based on the filtered preference data and send the anonymous playlist to a venue that provides ambient music.

Example 23 may include the client device of Example 22, further including a suggestion module to receive one or more additional venue suggestions from the cloud-based playlist server and present the one or more additional venue suggestions to the user.

Example 24 may include the client device of Example 22, wherein the cloud-based playlist server is to be instructed to generate the anonymous playlist via an interaction that is transparent to the user.

Example 25 may include the client device of any one of Examples 22 to 24, further including a location module to send the location data to the cloud-based playlist server via an interaction that is transparent to the user.

Example 26 may include a method of operating a client device, comprising identifying preference data associated with a user of the client device, wherein the preference data includes one or more of a music playlist, a lighting preference or a temperature preference, filtering the preference data based on one or more of location data associated with the user, calendar data associated with the user or message data associated with the user, and instructing a cloud-based playlist server to generate an anonymous playlist based on the filtered preference data and send the anonymous playlist data to a venue that provides ambient music.

Example 27 may include the method of Example 26, further including receiving one or more additional venue suggestions from the cloud-based playlist server, and presenting the one or more additional venue suggestions to the user.

Example 28 may include the method of Example 26, wherein the cloud-based playlist server is instructed to generate the anonymous playlist via an interaction that is transparent to the user.

Example 29 may include the method of any one of Examples 26 to 28, further including sending the location data to the cloud-based playlist server via an interaction that is transparent to the user.

Example 30 may include at least one computer readable storage medium comprising a set of instructions which, if executed, cause a client device to identify preference data associated with a user of the client device, wherein the preference data includes one or more of a music playlist, a lighting preference or a temperature preference, filter the preference data based on one or more of location data associated with the user, calendar data associated with the user or message data associated with the user, and instruct a cloud-based playlist server to generate an anonymous playlist based on the filtered preference data, and send the anonymous playlist data to a venue that provides ambient music.

Example 31 may include the at least one computer readable storage medium of Example 30, wherein the instructions, if executed, cause the client device to receive one or more additional venue suggestions from the cloud-based playlist server, and presenting the one or more additional venue suggestions to the user.

Example 32 may include the at least one computer readable storage medium of Example 30, wherein the cloud-based playlist server is to be instructed to generate the anonymous playlist via an interaction that is transparent to the user.

Example 33 may include the at least one computer readable storage medium of any one of Examples 30 to 32, wherein the instructions, if executed, cause the client device to send the location data to the cloud-based playlist server via an interaction that is transparent to the user.

Example 34 may include an apparatus to serve playlists, comprising means for performing the method of any one of Examples 8 to 13.

Example 35 may include a client device comprising means for performing the method of any one of Examples 26 to 28.

Thus, techniques described herein may enable individuals within physical proximity of ambient music venues/establishments to provide playlist input while preventing the establishments from accessing their devices. Moreover, the playlist input may be anonymous so that the establishments may not determine the identity or personal information of the individuals. In addition, the individuals may receive suggestions for other establishments that may be playing music to their liking. Techniques may also enable establishments to use predictive playlists to attract and/or deter individuals during specific time periods.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to serve playlists, comprising:
a proximity module to detect a proximity of one or more client devices to a venue that provides ambient music;
a filter module to filter preference data associated with the one or more client devices based on one or more of calendar data or message data associated with the one or more of the client devices;
a playlist module to generate an anonymous playlist based on filtered preference data associated with the one or more client devices, wherein the anonymous playlist lacks personal or other user-identifying information; and
a venue notification module to send the anonymous playlist to the venue.

2. The apparatus of claim 1, further including a suggestion module to suggest one or more additional venues to users of the one or more client devices based on the preference data and one or more playlists associated with the one or more additional venues.

3. The apparatus of claim 1, further including a prediction module to determine a future audience of the venue and generate a predictive playlist based on preference data associated with the future audience, wherein the venue notification module is to send the predictive playlist to the venue.

4. The apparatus of claim 3, wherein the future audience is to be determined based on historical location data received from a plurality of client devices.

5. The apparatus of claim 1, wherein the proximity module is to receive location data from the one or more client devices in interactions that are transparent to users of the one or more client devices, and wherein the proximity of the one or more client devices to the venue is to be detected based on the location data.

6. The apparatus of claim 1, wherein the playlist module is to receive one or more user playlists from the one or more client devices in interactions that are transparent to users of the one or more client devices, and wherein the preference data is to include the one or more user playlists.

7. The apparatus of claim 1, further including an environment module to generate one or more of a lighting profile or a temperature profile based on the preference data, wherein the venue notification module is to send one or more of the lighting profile or the temperature profile to the venue.

8. A method of operating a cloud-based playlist server, comprising:
detecting a proximity of one or more client devices to a venue that provides ambient music;
filtering preference data associated with the one or more client devices based on one or more of calendar data or message data associated with the one or more of the client devices;
generating an anonymous playlist based on filtered preference data associated with the one or more client devices, wherein the anonymous playlist lacks personal or other user-identifying information; and
sending the anonymous playlist to the venue.

9. The method of claim 8, further including sending one or more additional venue suggestions to at least one of the one or more client devices based on the preference data and one or more playlists associated with the one or more additional venues.

10. The method of claim 8, further including:
determining a future audience of the venue;
generating a predictive playlist based on preference data associated with the future audience; and
sending the predictive playlist to the venue.

11. The method of claim 10, wherein the future audience is determined based on historical location data received from a plurality of client devices.

12. The method of claim 8, further including receiving location data from the one or more client devices in interactions that are transparent to users of the one or more client devices, wherein the proximity of the one or more client devices to the venue is detected based on the location data.

13. The method of claim 8, further including receiving one or more user playlists from the one or more client devices in interactions that are transparent to users of the one or more client devices, wherein the preference data includes the one or more user playlists.

14. The method of claim 8, further including:
generating one or more of a lighting profile or a temperature profile based on the preference data; and
sending one or more of the lighting profile or the temperature profile to the venue.

15. At least one non-transitory computer readable storage medium comprising a set of instructions which, if executed, cause a cloud-based playlist server to:
detect a proximity of one or more client devices to a venue that provides ambient music;
filter preference data associated with the one or more client devices based on one or more of calendar data or message data associated with the one or more of the client devices;
generate an anonymous playlist based on filtered preference data associated with the one or more client devices, wherein the anonymous playlist lacks personal or other user-identifying information; and
send the anonymous playlist to the venue.

16. The non-transitory computer readable storage medium of claim 15, wherein the instructions, if executed, cause a computer to suggest one or more additional venues to users of the one or more client devices based on the preference data and one or more playlists associated with the one or more additional venues.

17. The non-transitory computer readable storage medium of claim 15, wherein the instructions, if executed, cause a computer to:
determine a future audience of the venue;
generate a predictive playlist based on preference data associated with the future audience; and
send the predictive playlist to the venue.

18. The non-transitory computer readable storage medium of claim 17, wherein the future audience is to be determined based on historical location data received from a plurality of client devices.

19. The non-transitory computer readable storage medium of claim 15, wherein the instructions, if executed, cause a cloud-based playlist server to receive location data from the one or more client devices in interactions that are transparent to users of the one or more client devices, wherein the proximity of the one or more client devices to the venue is to be detected based on the location data.

20. The non-transitory computer readable storage medium of claim 15, wherein the instructions, if executed, cause a cloud-based playlist server to receive one or more user playlists from the one or more client devices in interactions that are transparent to users of the one or more client devices, wherein the preference data is to include the one or more user playlists.

21. The non-transitory computer readable storage medium of claim 15, wherein the instructions, if executed, cause a cloud-based playlist server to:
generate one or more of a lighting profile or a temperature profile based on the preference data; and
send one or more of the lighting profile or the temperature profile to the venue.

22. A client device comprising:
a preference module to identify preference data associated with a user of the client device, wherein the preference data includes one or more of a music playlist, a lighting preference or a temperature preference;
a filter module to filter the preference data based on one or more of calendar data associated with the user or message data associated with the user; and
a server notification module to instruct a cloud-based playlist server to,
generate an anonymous playlist based on the filtered preference data, wherein the anonymous playlist lacks personal or other user-identifying information, and
send the anonymous playlist to a venue that provides ambient music.

23. The client device of claim 22, further including a suggestion module to receive one or more additional venue suggestions from the cloud-based playlist server and present the one or more additional venue suggestions to the user.

24. The client device of claim 22, wherein the cloud-based playlist server is to be instructed to generate the anonymous playlist via an interaction that is transparent to the user.

25. The client device of claim 22, further including a location module to send the location data to the cloud-based playlist server via an interaction that is transparent to the user.

* * * * *